United States Patent
Fujimoto

(10) Patent No.: US 6,911,985 B1
(45) Date of Patent: Jun. 28, 2005

(54) METHOD AND APPARATUS FOR REDUCING FRAME BUFFER SIZE IN GRAPHICS SYSTEMS

(75) Inventor: Shinya Fujimoto, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/732,083

(22) Filed: Dec. 10, 2003

(51) Int. Cl.[7] .............................................. G09G 5/399
(52) U.S. Cl. ....................... 345/539; 345/553; 345/522
(58) Field of Search ................................. 345/501, 502, 345/522, 530, 536, 539, 553, 545

(56) References Cited

U.S. PATENT DOCUMENTS 5,450,544 A * 9/1995 Dixon et al. ................. 345/501
5,617,113 A * 4/1997 Prince .......................... 345/103
6,498,606 B1 * 12/2002 Penna et al. ................. 345/422
6,734,873 B1 * 5/2004 Herf et al. .................... 345/545

* cited by examiner

Primary Examiner—Kee M. Tung
(74) Attorney, Agent, or Firm—Suiter-West PC LLO

(57) ABSTRACT

The present invention is directed to a method and apparatus for reducing the frame buffer size in a 3D graphics system. According to an exemplary aspect of the present invention, sorting and limiting the polygons that get processed at a given time may reduce the size of the frame buffer required in a graphics system. This may allow the system to process only those polygons that fall in one section of the screen. As a result, the system may not need to double buffer the whole screen. In a preferred embodiment, the location of the screen that gets processed may be arbitrary but should be preferably chosen so it is easy to sort the polygons and time-manage the process as the system needs to know when to swap from one location to another.

22 Claims, 4 Drawing Sheets

METHOD AND APPARATUS FOR REDUCING FRAME BUFFER SIZE IN GRAPHICS SYSTEMS

FIELD OF THE INVENTION

This invention relates generally to graphics systems, and particularly to a method and apparatus for reducing the frame buffer size in a graphics system.

BACKGROUND OF THE INVENTION

In a 3D graphics system, typically a large amount of memory is required to hold the display information for what is currently being displayed on the screen and separate information for the next frame. For example, in a system with graphics resolution of 320×240 at 16 bits/pixel, at least 153 KB of memory is required to hold the current frame and another 153 KB of memory is required for the next frame that gets processed while the current screen is being displayed. The frame buffer size is critical for the performance of a 3D graphics system as loading and unloading textures from the main memory may take a very long time. Therefore, it is desirable to provide as much free space in the frame buffer as possible in order to store textures and CLUTs (color lookup tables). On the other hand, a large frame buffer may directly affect the cost and power consumption of the system which are both critical factors to consider in a mobile electronics system such as PDAs (personal digital assistants), cell phones, mobile gaming systems, and the like.

Conventionally, CLUTs are used to reduce the size of textures. Instead of using the full 16 bits to represent the texture pixel data, a look up table may be used to assign colors that are going to be used for textures. This may reduce the maximum number of colors that can be used in a single texture and may also dramatically reduce the amount of memory needed for textures. However, CLUTs may not change the fact that there need be separate memory space for display and drawing regions in a frame buffer.

Tile based algorithms may also be used in some graphics systems to reduce the display and drawing region size. This method divides the screen into multiple tiles and draws only the pixels that fall into the working tile. Although tile based algorithms work well to reduce the memory size, it may also introduce a lot of inefficiencies because the GPU (graphics processing unit) may need to traverse through the list of drawing commands for the whole screen as many times as the number of tiles defined.

Thus, it would be desirable to provide a method and apparatus for efficiently reducing the frame buffer size in a graphics system.

SUMMARY OF THE INVENTION

The present invention is directed to a method and apparatus for reducing the frame buffer size in a 3D graphics system. According to an exemplary aspect of the present invention, sorting and limiting the polygons such as triangles and the like that get processed at a given time may reduce the size of the frame buffer required in a graphics system. This may allow the system to process only those polygons that fall in one section of the screen. As a result, the system may not need to double buffer the whole screen.

In a preferred embodiment, the location of the screen that gets processed may be arbitrary but should be preferably chosen so it is easy to sort the polygons and time-manage the process as the system needs to know when to swap from one location to another.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
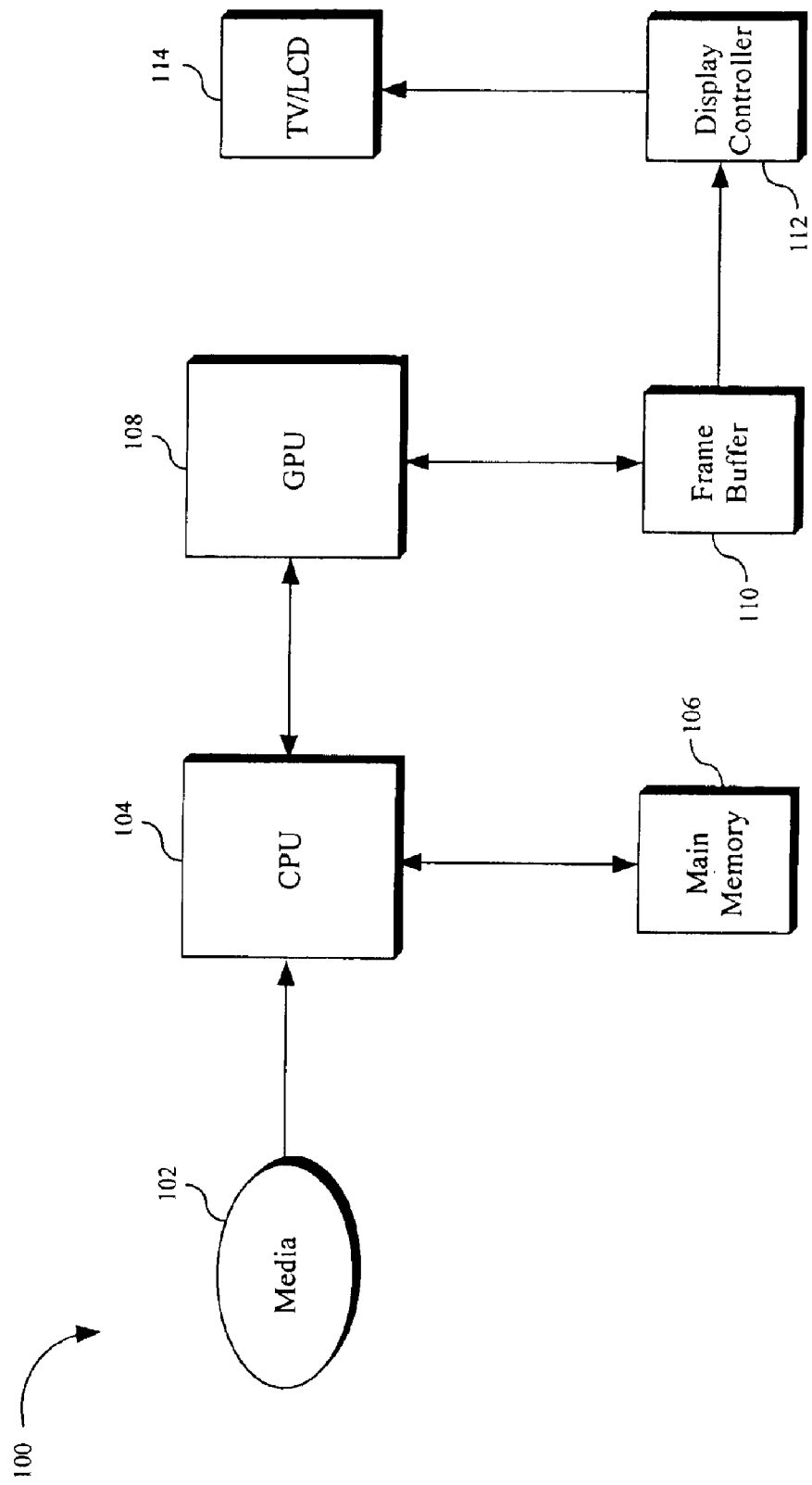
FIG. 1 is a schematic block diagram illustrating an exemplary 3D graphics system in which the present invention may be implemented.

FIG. 1 is a schematic block diagram illustrating an exemplary 3D graphics system 100 in which the present invention may be implemented. The graphics system 100 includes media 102, a central processing unit (CPU) 104 communicatively coupled to a main memory 106, a graphics processing unit (GPU) 108 communicatively coupled to a frame buffer 110 residing in a dedicated video memory, and a display controller or display processor 112 communicatively coupled to both the frame buffer 110 and a display device 114 such as a TV, LCD (liquid crystal display), and the like. The graphics system 100 may read data from the media 102 and display the corresponding 3D graphics on the display device 114.

In the 3D graphics systems, an object is typically drawn using numerous polygons such as triangles, and the like. A basic flow of operations in the graphics system 100 is shown as follows. The CPU 104 prepares a list of GPU rendering commands (or rendering commands) in the main memory 106. The GPU 108 reads the rendering commands from the main memory 106. The GPU 108 then decodes the rendering commands and draws pixel data to the frame buffer 110. The display controller 112 reads pixel data that gets displayed on the screen from the frame buffer 110. After each line gets drawn, a typical implementation of the display controller 112 generates a status signal allowing the CPU 104 or GPU 108 to synchronize its processing with the display controller 112. This status signal is commonly referred to as horizontal synchronization (HSYNC) signal. Similarly, there is a vertical synchronization (VSYNC) signal that the display controller 112 asserts when the display controller 112 has finished displaying the full screen. This VSYNC signal allows the CPU 104 and GPU 108 to know when to start drawing the next frame data.

When the GPU 108 processes the rendering commands and generates the pixels to be drawn, the GPU 108 stores the pixel data in the frame buffer 110 which typically resides in a dedicated video memory. In order for the GPU 108 to store pixel data for the next frame while the display controller 112 reads data out from the frame buffer 110, a technique called double buffering is used. The double buffering mechanism reserves two frames worth of memory space in the frame buffer 110 so that the data that are displayed on the screen through the display controller 112 may be held mutual exclusive to the memory location used by the GPU 108 to store the calculated results. The memory region that is read by the display controller 112 is often called a display region, and the region that the GPU 108 used to store the data for the next frame is referred to as a drawing region (see, e.g., FIGS. 2 and 5). The VSYNC signal from the display processor 112 is used to trigger both the CPU 104 and GPU 108 to swap the display and drawing regions.

Figure 2:
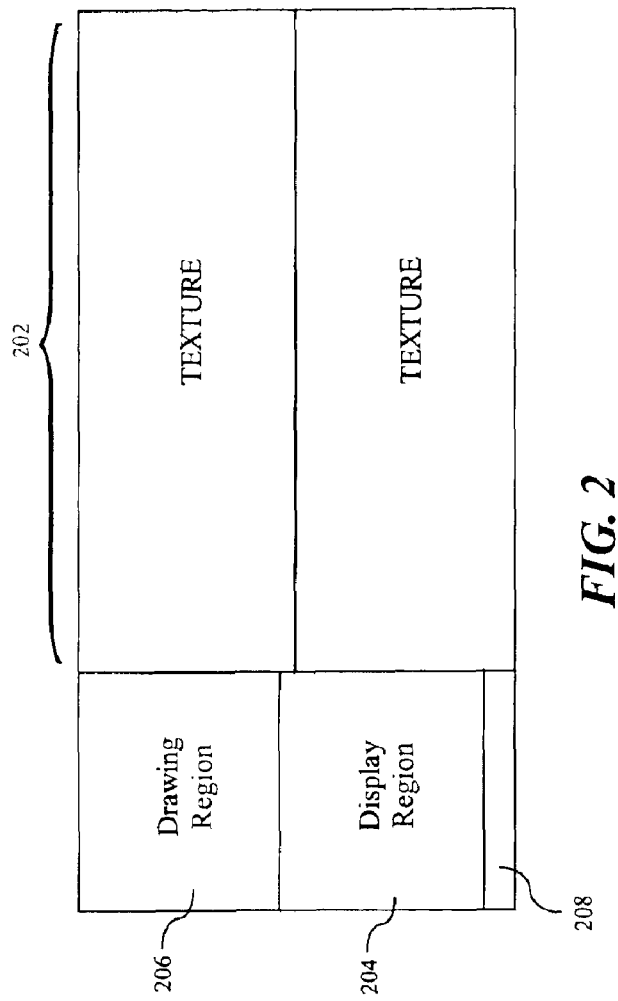
FIG. 2 shows the content of an exemplary frame buffer.

FIG. 2 shows the content of a typical frame buffer 200. As shown, the frame buffer 200 may include a texture area 202 for storing texture, a display region 204 for displaying a current frame, a drawing region 206 for drawing the next frame, and a CLUT area 208 for storing CLUTs.

In a typical 32-bit generation game system such as Sony's PlayStation and the like, the frame buffer size is roughly 1 MB (megabytes). The following calculations show a typical memory usage of the frame buffer in this system:

320×240 display resolution @ 16 bits per pixel=320× 240×16 bits=1,228,800 bits=153,600 bytes=153 KB/frame 2 frames stored in the frame buffer, so 153 KB×2≅300 KB out of 1 MB used for display and drawing regions so 700 KB is left for CLUTs and textures The frame buffer size is critical for the performance of a 3D graphics system as loading and unloading textures from the main memory usually takes a very long time. Therefore, it is desirable to have as much free space in the frame buffer as possible to store textures and CLUTs. On the other hand, a large frame buffer may directly affect the cost and power consumption of the system, which are both critical factors to consider in a mobile electronics system such as PDAs, cell phones, mobile gaming systems, and the like.

The present invention may reduce the size of the frame buffer required in a 3D graphics system by eliminating the need of storing two full frame worth of data in the frame buffer to perform double buffering. By sorting the rendering commands based upon the location of a triangle ahead of time, the graphics system only needs to process those triangles that fall in particular section of the screen. In a preferred embodiment, the location of the screen that gets processed should be chosen so that it is easy to manage the sorting and processing of the rendering commands. For example, the rendering commands may be sorted based on whether the polygon falls in the top half or the bottom half of the screen. Once the rendering commands are sorted, the GPU may draw half of the screen while the display controller reads and displays the other half of the screen. Presorting triangles to sub-frame level and restricting which of them gets drawn based on the current display activity is an advantageous feature compared to a typical 3D graphics system known in the art.

Figure 3:
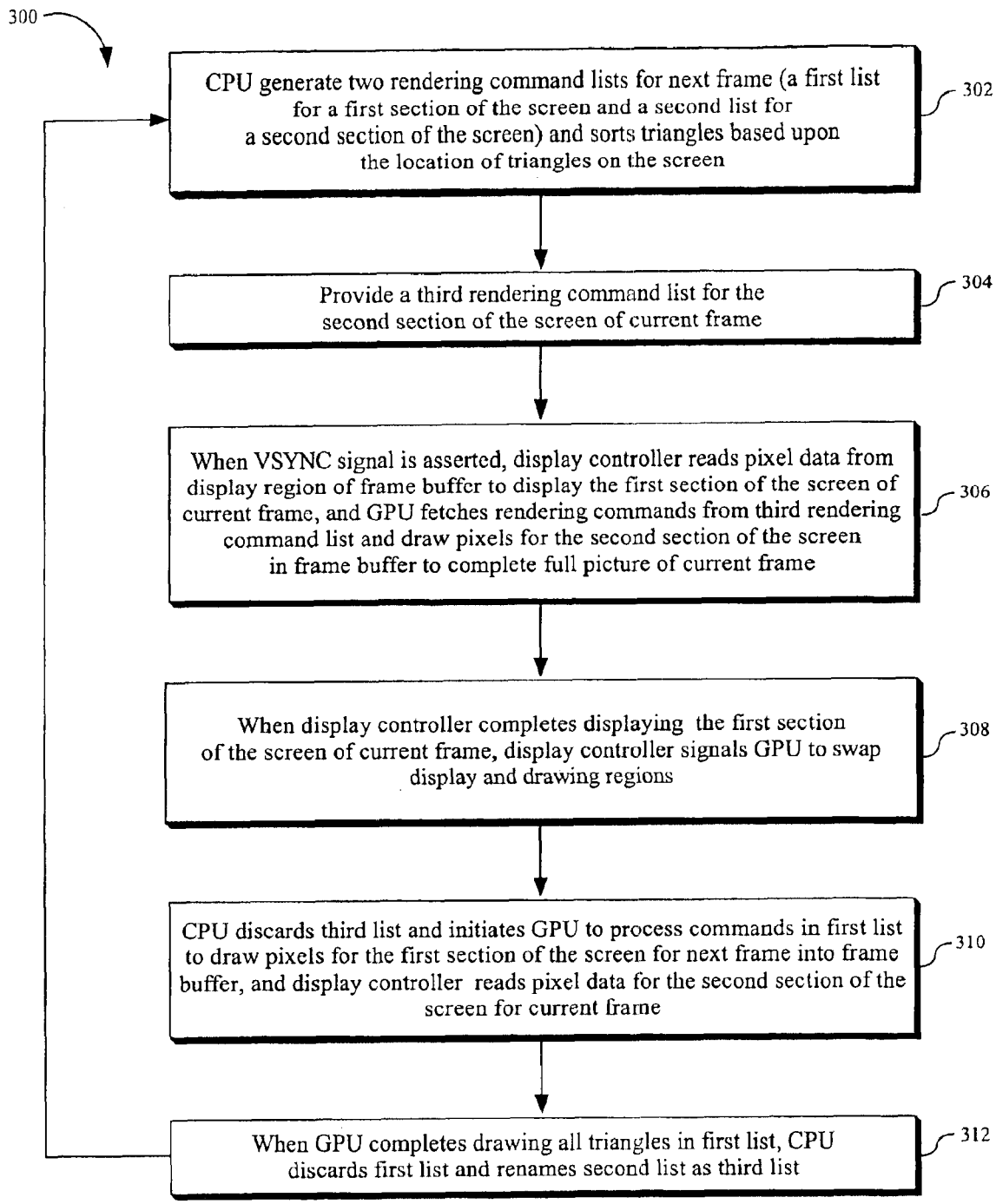
FIG. 3 shows a flow chart illustrating an exemplary method for reducing the frame buffer size in a graphics system in accordance with the present invention.

FIG. 3 shows a flow chart illustrating an exemplary method 300 for reducing the frame buffer size in a graphics system in accordance with the present invention. The method or process 300 may be implemented in the graphics system 100 shown in FIG. 1. As shown in FIG. 3, the method or process 300 may start with a step 302 in which a CPU generates two lists of GPU rendering commands (or rendering commands) in the main memory for the next frame to be drawn: a first rendering command list (or a first list) is for a first section of the screen, and a second rendering command list (or a second list) is for a second section of the screen. In a preferred embodiment, the first section may be the top half of the screen, and the second section may be the bottom half of the screen. Alternatively, the first section may be the bottom half of the screen, and the second section may be the top half of the screen. In a further embodiment, the first section may be the top ⅓ of the screen, and the second section may be the rest of the screen. It is understood that the location of the section on the screen may be selected as contemplated by a person of ordinary skill in the art without departing from the scope and spirit of the present invention. In the step 302, the CPU may also sort polygons such as triangles and the like of next frame based upon the location of the polygons on the screen. In a preferred embodiment, for each rendering command that the CPU generates, the CPU may check whether the polygon's top and bottom vertices fall in the first section of the screen or the second section of the screen and may then add the command to a corresponding list. For example, if a triangle's top and bottom vertices fall in the first section of the screen, the CPU may add the corresponding rendering command to the first list. If the polygon crosses the boundary between the first section and the second section of the screen, the CPU may add the corresponding rendering command to both the first list and the second list.

In step 304, a third rendering command list for the second section of the screen of the current frame may be provided. For example, the third list may be saved from the previous iteration (see step 312 below).

In step 306, when the display controller asserts the vertical synchronization (VSYNC) signal, the display controller may read the pixel data from the display region of the frame buffer to display the first section of the screen of the current frame, and, preferably simultaneously, GPU may fetch rendering commands from the third rendering command list and draw the pixels for the second section of the screen in the frame buffer to complete the full picture of the current frame.

Next, in step 308, when the display controller completes displaying the first section of the screen of the current frame, the display controller may signal GPU to swap the display and drawing regions. Then, in step 310, the CPU may discard the third list and initiate the GPU to start processing the rendering commands in the first list to draw pixels for the first section of the next frame into the frame buffer, and, preferably simultaneously, the display controller may start reading pixel data for the second section of the screen for the current frame. In a preferred embodiment, the CPU needs to complete creating the first and second rendering command lists for the next frame before the steps 308 and 310 in order to be able to process all rendering commands properly.

Next, in step 312, when the GPU completes drawing all polygons in the first list, the CPU may discard the first list and rename the second list as the third list, and the process 300 may then return to the step 302. Those of ordinary skill in the art will understand that renaming the second list as the third list does not physically have to take place. In other words, in a preferred embodiment, there are always three lists in FIFO. The first list may be processed by the GPU and is thrown away as it is finished. Then the GPU moves on to process the next list. The CPU may add more lists to the FIFO as the FIFO becomes ready. Alternatively, in the step 312, the process 300 may return to the step 302 for the CPU to start generating rendering command lists for the next frame without waiting for the GPU to complete drawing all polygons in the first list. In this case, preferably, the CPU may not corrupt the first list that GPU is working on and need save the third list that the GPU has not worked on yet.

Figure 4:
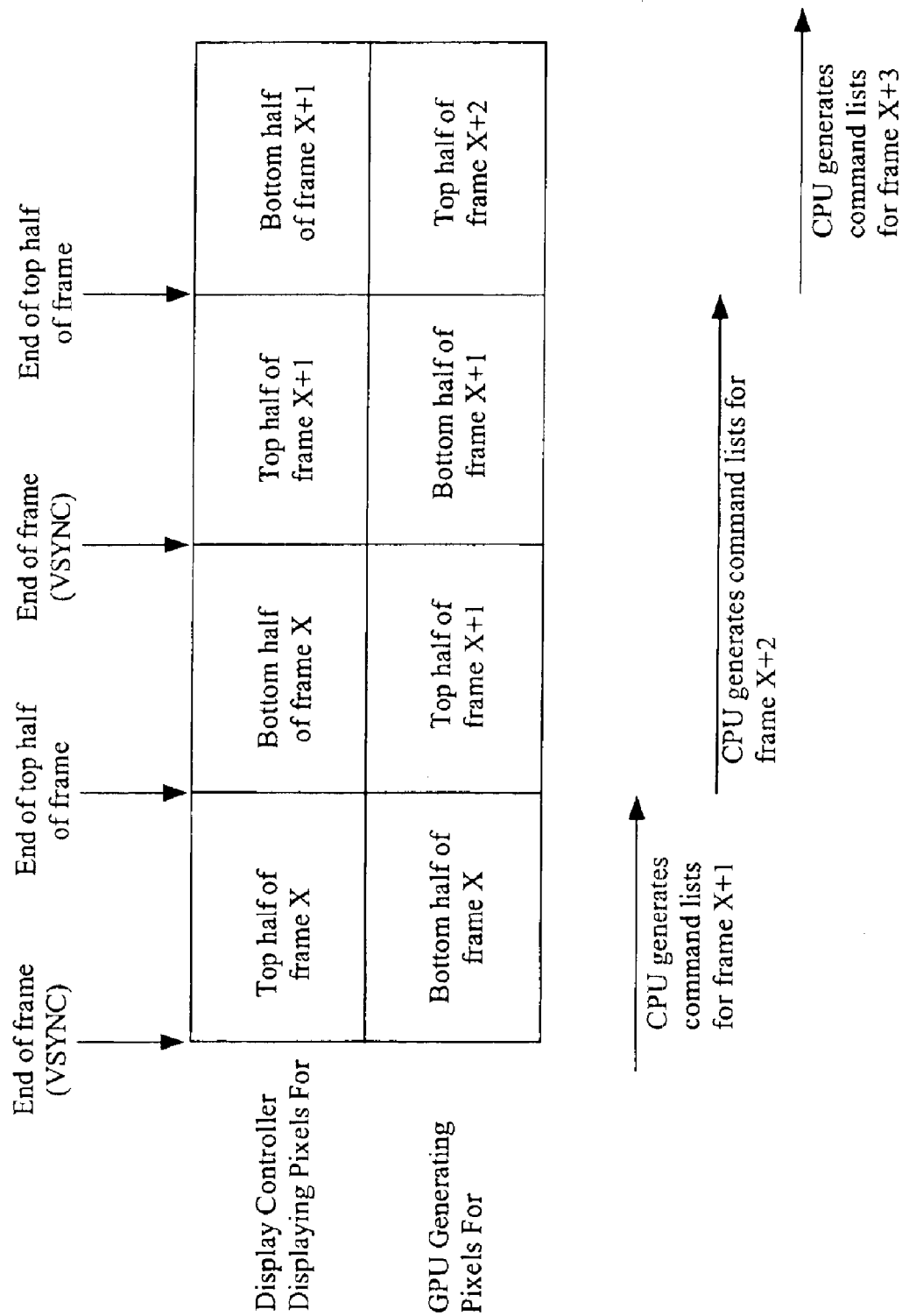
FIG. 4 shows an exemplary sequence of steps involved in the method shown in FIG. 3, where a first section of the screen is the top half of the screen and a second section of the screen is the bottom half of the screen.

FIG. 4 shows an exemplary sequence of steps involved in the process 300 shown in FIG. 3, where a first section of the screen is the top half of the screen and a second section of the screen is the bottom half of the screen.

Figure 5:
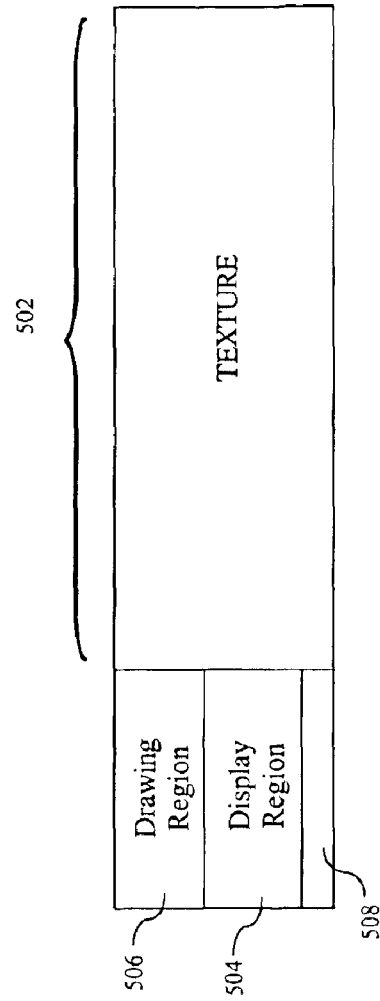
FIG. 5 shows the content of an exemplary frame buffer with a reduced memory size in accordance with an exemplary embodiment of the present invention.

FIG. 5 shows the content of an exemplary frame buffer 500 with a reduced memory size in accordance with an exemplary embodiment of the present invention. As shown, the frame buffer 500 may include a texture area 502 for storing texture, a display region 504 for displaying a current frame Frame X, a drawing region 506 for drawing the next frame Frame X+1, and a CLUT area 508 for storing a CLUT. In comparison with the frame buffer 202 shown in FIG. 2, the size of the frame buffer 400 is reduced to one half (½). It is understood that although the bottom half of the screen is used for displaying a current frame and the top half of the screen is used for drawing the next frame, they are not necessarily so. For example, the top half of the screen may be used to display the current frame and the bottom half of the screen may be used to draw the next frame. The section of the screen used to display the current frame and the section of the screen used to draw the next frame may be selected as contemplated by a person of ordinary skill in the art without departing from the scope and spirit of the present invention.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for reducing a frame buffer size in a graphics system, comprising steps of:
   (a) generating a first rendering command list and a second rendering command list for a next frame, said first rendering command list for a first section of a screen and said second rendering command list for a second section of said screen;
   (b) sorting polygons of said next frame based upon locations of said polygons on said screen;
   (c) providing a third rendering command list for said second section of said screen for a current frame;
   (d) when a VSYNC signal is asserted, reading pixel data from a display region of a frame buffer to display said first section of said screen for said current frame, fetching rendering commands from said third rendering command list, and drawing pixels for said second section of said screen in said frame buffer to complete a full picture of said current frame;
   (e) when said displaying said first section of said screen for said current frame is completed, signaling a GPU to swap said display region and a drawing region of said frame buffer; and
   (f) discarding said third rendering command list, processing rendering commands in said first rendering command list to draw pixels for said first section of said screen for said next frame into said frame buffer, and reading pixel data for said second section of said screen for said current frame.

2. The method of claim 1, wherein said first section of said screen is a top half of said screen and said second section of said screen is a bottom half of said screen.

3. The method of claim 1, wherein said first section of said screen is a bottom half of said screen and said second section of said screen is a top half of said screen.

4. The method of claim 1, wherein said step (b) comprising when top and bottom vertices of one of said polygons fall in one of said first section and said second section, adding a rendering command corresponding to said one of said polygons to a corresponding list for said one of said first section and said second section.

5. The method of claim 1, wherein said step (b) comprising when one of said polygons crosses a boundary between said first section and said second section, adding a rendering command corresponding to said one of said polygons to both said first rendering command list and said second rendering command list.

6. The method of claim 1, further comprising:
   when said GPU completes drawing all polygons in said first rendering command list, discarding said first rendering command list, renaming said second rendering command list as said third rendering command list, and returning to said step (a).

7. The method of claim 1, further comprising:
   returning to said step (a) without waiting for said GPU to complete drawing all polygons in said first rendering command list.

8. The method of claim 7, further comprising keeping integrity of said first rendering command list that said GPU is working on and saving said third rendering command list that said GPU has not worked on yet.

9. An apparatus for reducing a frame buffer size in a graphics system, comprising:
  (a) means for generating a first rendering command list and a second rendering command list for a next frame, said first rendering command list for a first section of a screen and said second rendering command list for a second section of said screen;
  (b) means for sorting polygons of said next frame based upon locations of said polygons on said screen;
  (c) means for providing a third rendering command list for said second section of said screen for a current frame;
  (d) when a VSYNC signal is asserted, means for reading pixel data from a display region of a frame buffer to display said first section of said screen for said current frame, means for fetching rendering commands from said third rendering command list, and means for drawing pixels for said second section of said screen in said frame buffer to complete a full picture of said current frame;
  (e) when said displaying said first section of said screen for said current frame is completed, means for signaling a GPU to swap said display region and a drawing region of said frame buffer; and
  (f) means for discarding said third rendering command list, means for processing rendering commands in said first rendering command list to draw pixels for said first section of said screen for said next frame into said frame buffer, and means for reading pixel data for said second section of said screen for said current frame.

10. The apparatus of claim 9, wherein said first section of said screen is a top half of said screen and said second section of said screen is a bottom half of said screen.

11. The apparatus of claim 9, wherein said first section of said screen is a bottom half of said screen and said second section of said screen is a top half of said screen.

12. The apparatus of claim 9, wherein said means for sorting (b) comprising when top and bottom vertices of one of said polygons fall in one of said first section and said second section, means for adding a rendering command corresponding to said one of said polygons to a corresponding list for said one of said first section and said second section.

13. The apparatus of claim 9, wherein said means for sorting (b) comprising when one of said polygons crosses a boundary between said first section and said second section, means for adding a rendering command corresponding to said one of said polygons to both said first rendering command list and said second rendering command list.

14. The apparatus of claim 9, further comprising:
  when said GPU completes drawing all polygons in said first rendering command list, means for discarding said first rendering command list and means for renaming said second rendering command list as said third rendering command list.

15. A computer-readable medium having computer-executable instructions for performing a method for reducing a frame buffer size in a graphics system, said method comprising steps of:
  (a) generating a first rendering command list and a second rendering command list for a next frame, said first rendering command list for a first section of a screen and said second rendering command list for a second section of said screen;
  (b) sorting polygons of said next frame based upon locations of said polygons on said screen;
  (c) providing a third rendering command list for said second section of said screen for a current frame;
  (d) when a VSYNC signal is asserted, reading pixel data from a display region of a frame buffer to display said first section of said screen for said current frame, fetching rendering commands from said third rendering command list, and drawing pixels for said second section of said screen in said frame buffer to complete a full picture of said current frame;
  (e) when said displaying said first section of said screen for said current frame is completed, signaling a GPU to swap said display region and a drawing region of said frame buffer; and
  (f) discarding said third rendering command list, processing rendering commands in said first rendering command list to draw pixels for said first section of said screen for said next frame into said frame buffer, and reading pixel data for said second section of said screen for said current frame.

16. The computer-readable medium of claim 15, wherein said first section of said screen is a top half of said screen and said second section of said screen is a bottom half of said screen.

17. The computer-readable medium of claim 15, wherein said first section of said screen is a bottom half of said screen and said second section of said screen is a top half of said screen.

18. The computer-readable medium of claim 15, wherein said step (b) comprising when top and bottom vertices of one of said polygons fall in one of said first section and said second section, adding a rendering command corresponding to said one of said polygons to a corresponding list for said one of said first section and said second section.

19. The computer-readable medium of claim 15, wherein said step (b) comprising when one of said polygons crosses a boundary between said first section and said second section, adding a rendering command corresponding to said one of said polygons to both said first rendering command list and said second rendering command list.

20. The computer-readable medium of claim 15, wherein said method further comprising:
  when said GPU completes drawing all polygons in said first rendering command list, discarding said first rendering command list, renaming said second rendering command list as said third rendering command list, and returning to said step (a).

21. The computer-readable medium of claim 15, wherein said method further comprising:
  returning to said step (a) without waiting for said GPU to complete drawing all polygons in said first rendering command list.

22. The computer-readable medium of claim 21, wherein said method further comprising keeping integrity of said first rendering command list that said GPU is working on and saving said third rendering command list that said GPU has not worked on yet.

* * * * *